United States Patent [19]

Kohashi et al.

[11] Patent Number: 5,635,679
[45] Date of Patent: Jun. 3, 1997

[54] DEVICE AND METHOD FOR DETERMINING WEIGHING CONDITIONS OF DYNAMIC WEIGHING DEVICE

[75] Inventors: Toru Kohashi, Hyogo-ken; Morihito Kamon, Kasai, both of Japan

[73] Assignee: Yamato Scale Company, Limited, Akashi, Japan

[21] Appl. No.: 210,142

[22] Filed: Mar. 17, 1994

[51] Int. Cl.$^6$ ............ G01G 19/22; G01C 25/00
[52] U.S. Cl. ............ 177/25.13; 177/50; 177/145; 73/1.13; 364/571.02
[58] Field of Search ............ 364/571.02, 554; 177/1, 25.11, 25.12, 25.13, 50, 119, 145; 73/1 B

[56] References Cited

U.S. PATENT DOCUMENTS

| | | | |
|---|---|---|---|
| 3,763,361 | 10/1973 | Smart | 364/554 |
| 4,231,439 | 11/1980 | Hall, Jr. et al. | 177/25.11 |
| 5,062,492 | 11/1991 | Inoue | 177/25.14 |
| 5,191,543 | 3/1993 | Berthel et al. | 364/571.02 |
| 5,300,736 | 4/1994 | Ehrhardt | 177/145 |

FOREIGN PATENT DOCUMENTS 2049945  7/1979  Japan ............ G01G 23/37

Primary Examiner—Michael L. Gellner
Assistant Examiner—Randy W. Gibson
Attorney, Agent, or Firm—Senniger, Powers, Leavitt & Roedel

[57] ABSTRACT

In a dynamic weighing device including a weight signal treating filter for measuring the weight of an article while the article is conveyed by a weighing conveyer, a device and a method of automatically determining an optimum time point for reading the weight signal and/or an optimum characteristic of the filter to be used, wherein the weight signal is read and stored plural times between two predetermined time points with and/or without variation of the filter characteristic, this operation is repeated about the same article or a plurality of articles which are substantially same in weight and, thereafter, the reading time point and filter characteristic corresponding to one of the groups of weight measurements of the respective times which gives a minimum dispersion of the weight measurements are selected as the optimum conditions.

22 Claims, 4 Drawing Sheets

DEVICE AND METHOD FOR
DETERMINING WEIGHING CONDITIONS
OF DYNAMIC WEIGHING DEVICE

BACKGROUND OF THE INVENTION

This invention relates to a device and a method of determining weighing conditions of a dynamic weighing device for weighing an article during its conveyance by a weighing conveyer, for example. Especially, it relates to a device and a method used in such a dynamic weighing device for automatically determining weighing conditions relating to the timing of measurement and the response characteristic value of a filter thereof.

The weighing conditions of the dynamic weighing device include, for example, the timing for measurement of the weight of an article and the response characteristic of a filter for treating weight signals. It is possible to improve the weighing accuracy of the weighing device by adequately setting such weighing conditions in the device.

For example, Japanese opened patent gazette No. H3(91)-282220 discloses an exemplary device used in a weight sorter for determining the timing of measurement. The weight sorter is arranged to weigh articles fed onto a weighing conveyer by a weigher attached to the weighing conveyer and to sort the weighed articles based upon their measured weights. The measured weight is defined as an average of the weight signal generated by each article between two predetermined time points. When the same article is weighed plural times, the measured weight exhibits some variation and the magnitude of variation differs with the positions of two time points. Accordingly, the operator of the weight sorter is required to manually change the positions to record measured data and study the data to determine such positions corresponding to the minimum dispersion thereof before commencing a normal operation.

The weight signal from the weigher is supplied to the measuring means through a filter and, therefore, the measured value and its variation are both subjected to the influence of the response characteristic of the filter. Accordingly, the operator of the sorter is also required to have the response characteristic of the filter made variable and adjust it to determine its value corresponding to the minimum variation of the measured value through a similar procedure to that in determination of the above-mentioned time points.

As described above, in the weight sorter of the above-mentioned Japanese Official gazette, the operator must determine the timing of measurement and response characteristic of the filter before commencing a normal operation in order to assure weighing accuracy. However, this determination procedure includes such a problem in that it requires not only a lot of time and labor, but also a significantly experienced and skilled operator.

Accordingly, an object of this invention is to provide a novel and improved device and method for automatically determining optimum weighing conditions in a dynamic weighing device as described above.

SUMMARY OF THE INVENTION

According to a feature of this invention, an article or articles having substantially same weights are weighed repeatedly by a dynamic weighing device. resultant weight signals from the device are read at plural time points and the read weights are grouped and stored for the respective time points. Calculations are automatically performed to determine the time point corresponding to the group of read weights exhibiting minimum dispersion. The optimum time point is therefore determined.

According to another feature of this invention, an article or articles having substantially same weights are weighed repeatedly by a dynamic weighing device. resultant weight signals from the device are treated individually by plural filters or a filter having means for automatically adjusting its response characteristic. The output weight signals of the respective filter(s) are read at a predetermined time point for plural response characteristic values and the read weights are grouped and stored. Calculations are automatically performed to the response characteristic value to determine the filter or filter response characteristic exhibiting minimum dispersion. The optimum response characteristic value is therefore determined.

These and other features and functions of this invention will be described in more detail below in connection with its preferred embodiments with reference to the accompanying drawings.

DETAILED DESCRIPTION OF PREFERRED EMBODIMENTS

Figure 1:
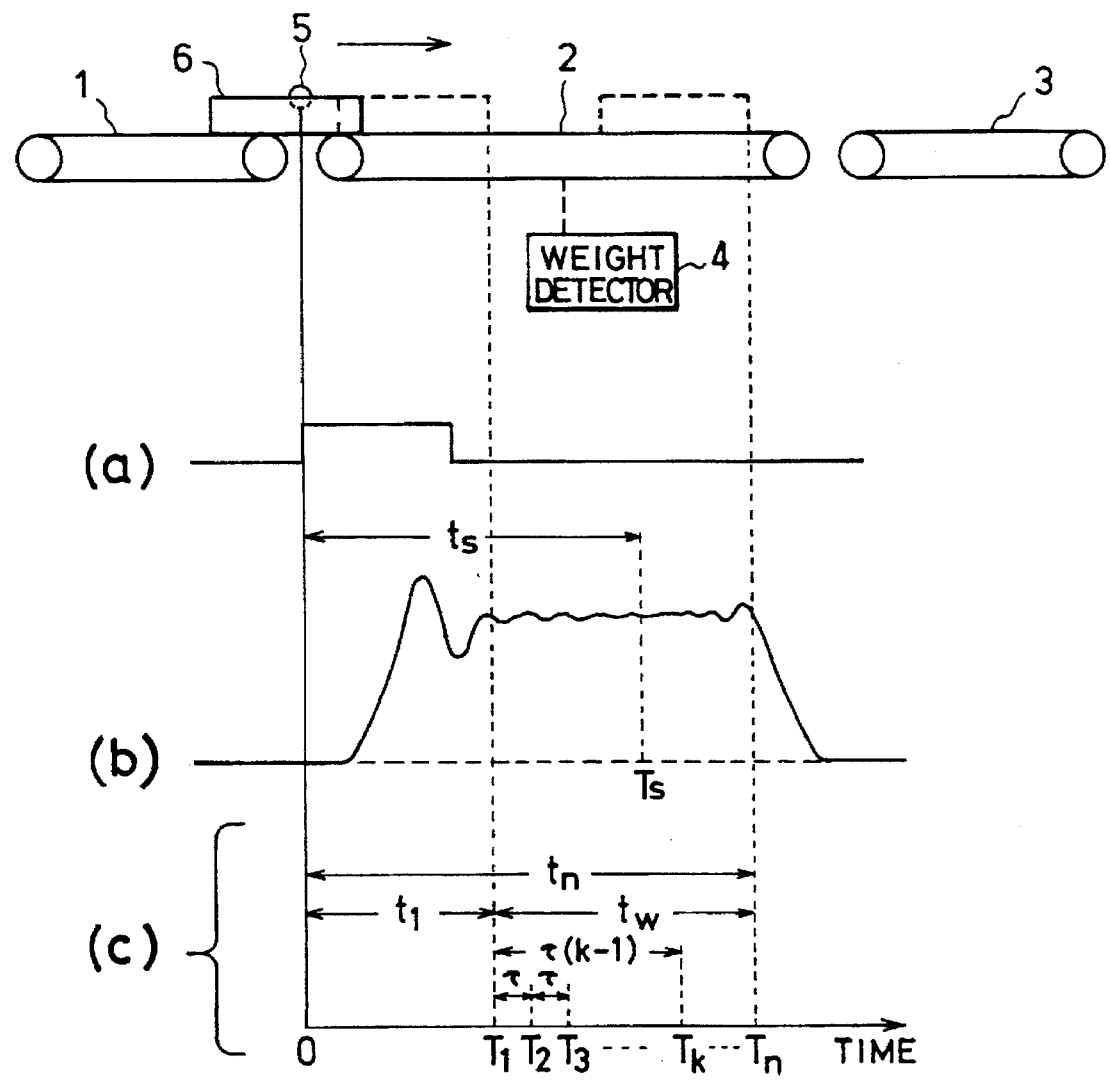
FIG. 1 is a diagram showing a schematic structure and the timing of measurements of an embodiment of the weight sorter according to this invention.
Figure 2:
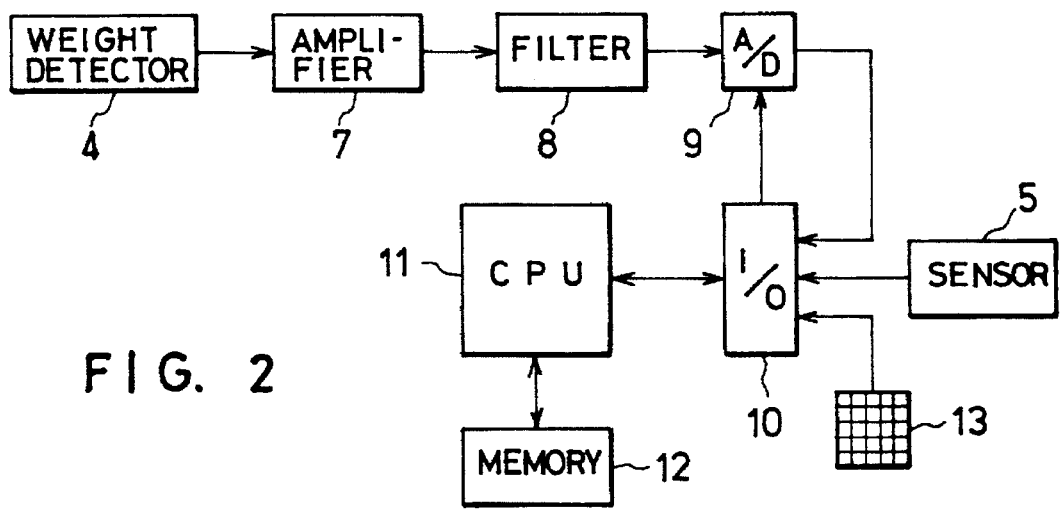
FIG. 2 is a block diagram showing an electric circuit configuration of the weight sorter of FIG. 1 and its weighing condition determining device.
Figure 3:
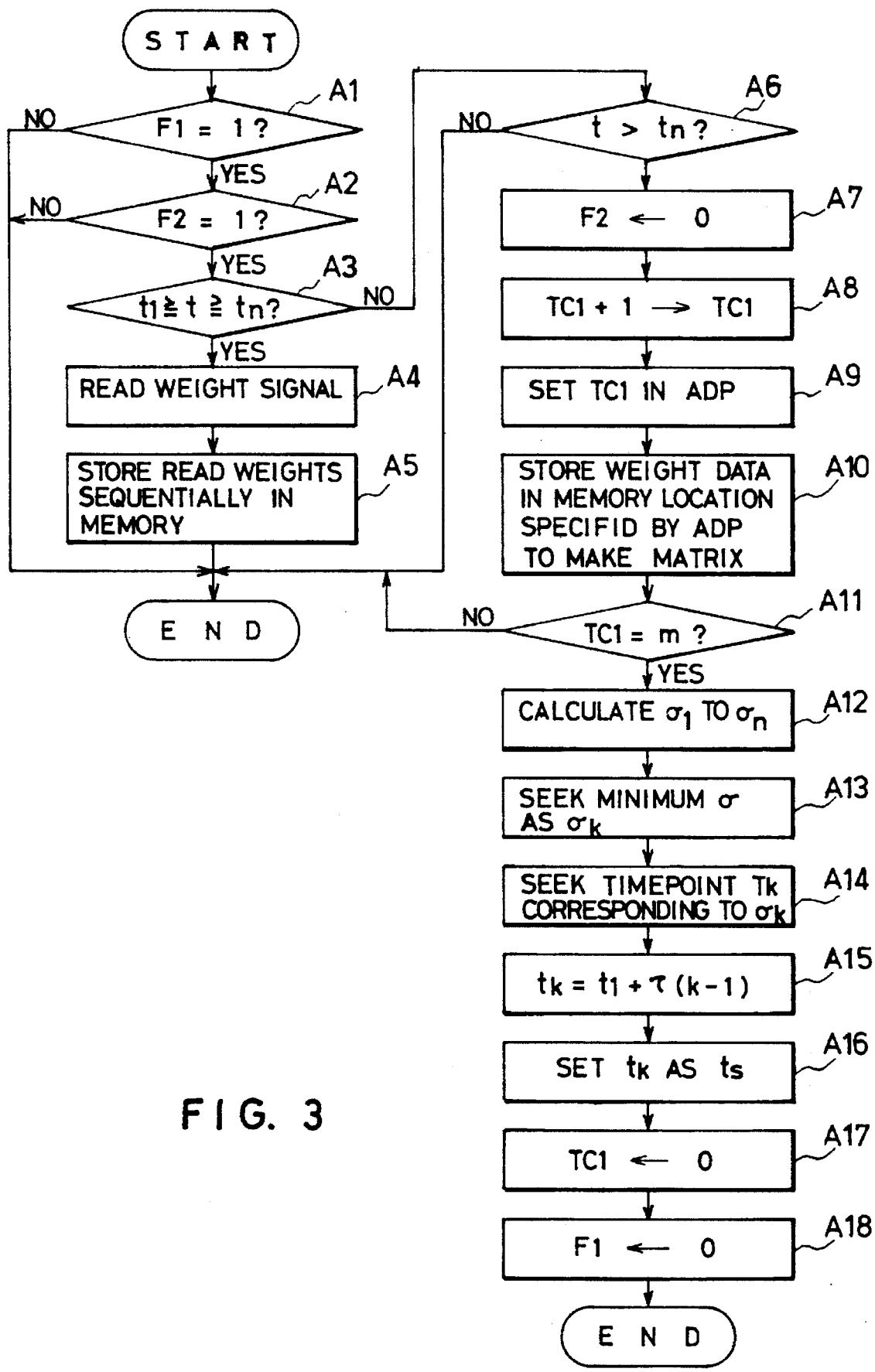
FIG. 3 is a flow chart showing the determination procedure of the timing of measurement by the above embodiment of the weighing condition determining device.

Referring to FIG. 1, a weight sorter including a first embodiment of the weighing condition determining device of this invention is provided with a loading conveyer 1, a weighing conveyer 2 and an unloading conveyer 3. The weighing conveyer 2 is supported by a weight detector 4 such as a load cell. An article sensor 5, such as a photosensor is disposed between the loading conveyer 1 and the weighing conveyer 2 for sensing passage of an article 6. When the article 6 is fed onto the loading conveyer 1, it is conveyed by the conveyers 1, 2 and 3 from the left to right in the drawing as shown by an arrow and sensed by the sensor 5 on the way thereof. Then, the sensor 5 supplies a sense output as shown in waveform (a) of FIG. 1 through an input/output (I/O) circuit 10 to a central processing unit (CPU) 11 as shown in FIG. 3. While the article 6 is conveyed by the weighing conveyer 2, the weight detector 4 generates a weight signal varying with time. As shown in FIG. 2, the weight signal is amplified by an amplifier 7 and treated by a filter 8 for removing its high frequency component to become a signal having a waveform as shown in waveform (b) of FIG. 1. The output signal of the filter 8 is converted into a digital signal by an analog-to-digital (A/D) convertor 9 having a short sampling period τ such as 0.1 to 1 millisecond and supplied through the I/O circuit 10 to the CPU 11. In a sorting mode of operation, the CPU 11 reads the weight signal at a time point after a preset time $t_s$ from reception of the output of the article sensor 5 as shown in FIG. 1(b), compares it with a predetermined allowable weight range and supplies the result of comparison as a sorting signal to the unloading conveyer 3. The unloading conveyer 3 changes its conveying path in accordance with the sorting signal.

The CPU 11 constitutes the weighing condition determining device of this invention together with an accompanying memory unit 12 (FIG. 2) having random access memory (RAM) and read-only memory (ROM). In an adjusting mode of operation of the weight sorter, this device operates in accordance with a program preset in a programmable ROM (PROM) in the memory unit 12 to determine the above-mentioned optimum position of the time point Ts for reading the weight signal in the above-mentioned sorting mode of operation. Its procedure will be described below with reference to the flow chart of FIG. 3.

The operator first operates an input unit 13 such as the keyboard of FIG. 2 to set the device in the adjusting mode of operation. Then, an adjusting mode flag F1 in the memory unit 12 becomes "1". The flag F1 becomes "1" in the adjusting mode and "0" in the sorting mode. Next the CPU 11 inquires whether F1 is "1" or not (step A1) and the program advances to the next step.

Next, the operator inputs weighing conveyer length L1, conveyer speed V and article length L2 from the input unit 13. Then, the CPU 11 calculates measuring time points T1 and Tn of section (c) of FIG. 1 from these values. As shown, the time point T1 is the one at which the leading end of the article 6 passes to about the one-third point of the length of the weighing conveyer 2 and the time point Tn is one at which it comes to the end of the weighing conveyer 2. As shown, the lengths of time until the time points T1 and Tn after the sensor 5 senses the article are referred to as $t_1$ and $t_n$, respectively. The time interval between the time points T1 and Tn is referred to as $t_w$.

Furthermore, the operator inputs a predetermined number of measurements, that is, a value m of the number TC1 of articles to be passed through the weighing conveyer 2, from the input unit 13. TC1 is counted by the CPU 11 from its initial value zero, as described below.

In the next step, the operator supplies a reference article to the weighing conveyer 2 through the loading conveyer 1. Then, the article is sensed by the sensor 5 and the CPU 11 is actuated by the sense signal of the sensor 5 to turn a sense flag F2 to "1" and, at the same time, to commence measurement of time t. Accordingly, the program advances to step A3 after it has determined that the flag F2 is "1" in step A2. In step A3, the CPU inquires whether the time t falls between $t_1$ and $t_n$ and, if yes, the CPU 11 reads the digital weight signal supplied through the I/O circuit 10 (stem A4). In other words, the CPU 11 reads the weight signal successively during the time interval $t_w$ at the sampling period τ of the A/D convertor 9 and stores weight values W1, W2 ... Wn at the reading time points T1, T2, ... Tn sequentially in predetermined memory locations of the memory unit 12 (stem A5). Accordingly, $n=(t_w/\tau)+1$.

If the time t does not fall between $t_1$ and $t_n$ in step A3, the program advances to step A6 and it is inquired whether t exceeds $t_n$ or not. If yes, the sense flag F2 turns to "0" (step A7) and the count TC1 is advanced by one (stem A8) to become one at this time, and set in an address pointer (ADP) (stem A9). Then, the weight values of the first measurement which were read in step A5 are transferred to a memory location specified by the ADP and stored therein (stem A10). Next, it is inquired whether the value of TC1 equals to m or not (stem A11) and, if not, the operation is ended.

Then, the operator supplies the reference article delivered to the unloading conveyer 3 again to the weighing conveyer 2 through the loading conveyer 1. A similar operation is then executed, so that the count TC1 becomes two in stem A8 and the second weight measurements are stored in the next memory location specified by the ADP in step A10. When a similar operation is repeated m times, m×n weight values are stored sequentially in matrix fashion in the memory locations specified by the ADP as shown in Table 1 and the inquiry of step A11 is affirmed to advance the program to step A12.

TABLE 1

| | Matrix of Weight Data | | | | |
|---|---|---|---|---|---|
| Read Time Point | T1 | T2 | ... | Tk | ... | Tn |
| 1st Measurement | W11 | W21 | ... | Wk1 | ... | Wn1 |
| 2nd measurement | W12 | W22 | ... | wk2 | ... | Wn2 |
| . | . | . | | . | | . |
| . | . | . | | . | | . |
| . | . | . | | . | | . |
| mth Measuerment | W1m | W2m | ... | Wkm | ... | Wnm |
| Std. Deviation | σ₁ | σ₂ | ... | σₖ | ... | σₙ |

In step A12, the CPU 11 calculates standard deviations $\sigma_1, \sigma_2, \ldots \sigma_n$ of m weight values read at the above-mentioned respective time points and stores them in the memory unit 12 as shown in Table 1. Next, the CPU 11 compares the standard deviations with each other to seek a minimum value $\sigma_k$ of them (step A13). If there are two or more equivalent minimum values, one nearest to the time point T1 is selected for the purpose of avoiding danger of contact of the article with the unloading conveyer due to variation of the weighing conveyer speed. Then, the CPU 11 seeks a time point Tk corresponding to the minimum standard deviation $\sigma_k$ (step A14) and calculates the time $t_k$ after output generation of the sensor 5 until the time point Tk (step A15). It is given by an equation $t_k=t_1+\sigma(k-1)$. The time point Tk is the one at which the least dispersion of measurements and the highest weighing accuracy are obtainable at the time of weighing the articles which are similar in weight to the above-mentioned reference article and it corresponds to the optimum position of the aforementioned reading time point Ts for the weight signal. Accordingly, the calculated value of $t_k$ is stored in the memory unit 12 as the optimum timing for weight measurement (step A16). Next, the count TC1 is cleared to zero (step A17) and the adjusting mode flag F1 is turned to "0" to reset the device in the sorting mode to prepare for the normal sorting operation (step A18).

While the standard deviations of the measured weights are calculated in the above operation, an alternative statistical value, such as variance, which represents the magnitude of dispersion, may be used instead. While the same article is weighed repeatedly, a plurality of articles which are substantially the same in weight may be weighed successively. This method is advantageous in that it can save time and labor in the adjusting operation without a significant reduction in weighing accuracy.

Now, the procedure of normal sorting operation following the above-mentioned step A18 will be described below with reference to the flow chart of FIG. 4. In this case, articles to be sorted are sequentially fed through the loading conveyer 1 to the weighing conveyer 2. It is first inquired whether the sense flag F2 is "1" (step B1). When the article sensor 5 senses one of the articles, the CPU 11 commences to count the time t and, at the same time, turns the sense flag F2 to "1". Accordingly, the program advances to step B2 and it is inquired whether t equal $t_k$ (i.e., $t_s$), calculated during the adjusting mode. When t reaches $t_k$, the CPU 11 reads the weight signal (step B3) and turns the sense flag F2 to "0" (step B4) and the weighing end flag F3 to "1" (step B5) and the program returns to step B1. The CPU 11 also compares the read value of the weight signal with a predetermined allowable weight range and supplies its result to the unloading conveyer 3 as a sorting signal. Since the sense flag F2 is not "1" in step B1 now, it is inquired whether the weighing end flag F3 is "1" in step B6. If yes, the unloading conveyer 3 selectively changes its article discharge path in accordance with the sorting signal (step B7). Thereafter, the CPU 11 turns the weighing end flag F3 to "0" (step B8) to finish the sorting operation of that article.

Even if the best position of the weighing signal reading time point Ts is selected as above, the dispersion of the measured values is further subjected to influence of the response characteristic of the filter 8 for treating the weight signal. According to the second embodiment of this invention, the response characteristic of the filter can be selected so as to minimize the dispersion of the measured weight values.

Figure 5A:
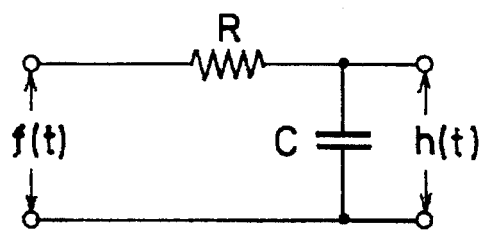
FIGS. 5A and 5B are schematic diagrams respectively showing an analog filter and a digital filter equivalent thereto which are used in a second embodiment of this invention.

FIG. 5A shows an example of a simple analog filter. If the input of this filter is f(t) and the output thereof is h(t), the following relationship is given therebetween as is well known.

$$f(t)=CR \cdot [dh(t)/dt]+h(t)$$

As is well known, this equation can be transformed as follows:

$$h(n\tau)=A \cdot h[(n-1)\tau]+B \cdot f(n\tau)$$

where $A=CR/[(CR/\tau)+1]\tau$
$B=1/[(CR/\tau)+1]$

Figure 5B:
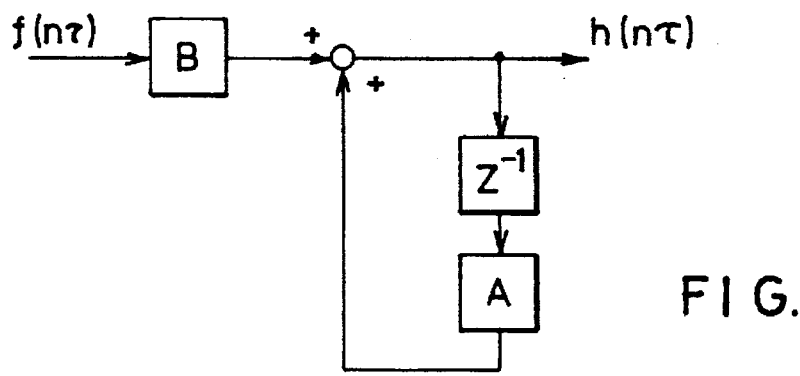

Accordingly, the analog filter of FIG. 5A is equivalent to a digital filter as shown in FIG. 5B. This digital filter is programmable and its time constant TC can be changed by causing the CPU 11 to execute its program.

In the second embodiment, the device is previously set in the sorting mode so that the weight signal is read always at the time point Tk. Moreover, the digital filter is programmed so that its time constant varies sequentially as TC1, TC2, ... TCp. If the reference article is weighed repeatedly in this state as in the first embodiment, weight values corresponding to the respective time constants are stored in matrix fashion as shown in Table 2.

TABLE 2

Weight Data Matrix Regarding Capacitor Characteristic

| Time Constant | TC1 | TC2 | ... | TCp |
|---|---|---|---|---|
| 1st Measurement | W1k1 | W2k1 | ... | Wpk1 |
| 2nd Measurement | W1k2 | W2k2 | ... | Wpk2 |
| . | . | . | . | . |
| . | . | . | . | . |
| . | . | . | . | . |
| mth Measurement | W1km | W2km | ... | Wpkm |
| Std. Deviations | 1' | 2' | ... | p' |

Next, the CPU 11 calculates standard deviations of m measured weights for the respective time constants and seeks the time constant corresponding to the minimum standard deviation to fix the filter to this time constant. Thus the adjusting operation of the device for the filter characteristic is ended. When two or more standard deviations are of the same value, the one corresponding to the greatest time constant is selected, since the greater the time constant, the greater the noise removing power. In this case also, other statistical parameters such as variance which represents the magnitude of dispersion may be used instead of the standard deviation. Further, a plurality of analog filters having different time constants may be switched to change the time constant instead of programming the digital filter.

Although, in the second embodiment, the dispersion of the measured weights is considered to vary individually with respect to the reading time point and filter characteristic and the optimum filter characteristic is determined by reading the weight signal at the optimum time point determined in accordance with the first embodiment, there may be a mutual relationship in practice between the reading time point and filter characteristic and the filter characteristic determined in the second embodiment may not always be optimum. The third embodiment solves this problem.

TABLE 3

Weight Data Matrix Regarding Reading Time Point & Filter Characteristic

| Time Constant | TC1 | | | | TC2 | | | | ... | TCp | | | |
|---|---|---|---|---|---|---|---|---|---|---|---|---|---|
| Read Time Point | T1 | T2 | ... | Tn | T1 | T2 | ... | Tn | ... | T1 | T2 | ... | Tn |
| 1st Measurement | W111 | W121 | ... | W1n1 | W211 | W221 | ... | W2n1 | ... | Wp11 | Wp21 | ... | Wpn1 |
| 2nd Measurement | W112 | W122 | ... | W1n2 | W212 | W222 | ... | W2n2 | ... | Wp11 | Wp21 | ... | Wpn2 |
| . | . | . | . | . | . | . | . | . | . | . | . | . | . |
| . | . | . | . | . | . | . | . | . | . | . | . | . | . |
| . | . | . | . | . | . | . | . | . | . | . | . | . | . |

TABLE 3-continued

| | Weight Data Matrix Regarding Reading Time Point & Filter Characteristic | | | | | | | | | | | |
|---|---|---|---|---|---|---|---|---|---|---|---|---|
| Time Constant | TC1 | | | | TC2 | | | | ... | TCp | | |
| Read Time Point | T1 | T2 | ... | Tn | T1 | T2 | ... | Tn | ... | T1 | T2 | ... | Tn |
| mth Measurement | W11m | W12m | ... | W1nm | W21m | W22m | ... | W2nm | ... | Wp1m | Wp2m | ... | Wpnm |
| Std. Deviation | $\sigma_{11}$ | $\sigma_{12}$ | | $\sigma_{1n}$ | $\sigma_{21}$ | $\sigma_{22}$ | | $\sigma_{2n}$ | ... | $\sigma_{p1}$ | $\sigma_{p2}$ | | $\sigma_{pn}$ |

In the third embodiment also the digital filter is programmed and its time constant is switched sequentially as TC1, TC2 . . . TCp for respective reference articles to be weighed, as with the second embodiment. At the same time, as in the first embodiment, the weight signal is read at time points T1, T2 . . . Tn for each article and stored in the memory unit in matrix fashion as weight data as shown in Table 3. Next, standard deviations of n×p groups in total of weight data each consisting of m weight values for each time constant and each reading time point are calculated and the reading time point and filter characteristic corresponding to the minimum standard deviation are selected therefrom and stored. If there are two or more minimum standard deviations, it is preferable to select one corresponding to the reading time point nearer T1 and the time constant greater than the others.

Although the minimum value of the standard deviations is selected in the above embodiments this selection relates to weighing accuracy required by the dynamic weighing device in question. In other words, the second or third minimum, etc., may be selected when less weighing accuracy is required. The weight signal reading time between T1 and Tn may be set optionally and it may be a time for which the article is on the weighing conveyer. Instead of using the output of the article sensor 5 as a reference for determining the reading time, a comparator having a threshold value preset therein is disposed in the weight signal processing circuit to use a time period for which the weight signal exceeds the threshold value as the reading time.

Figure 6:
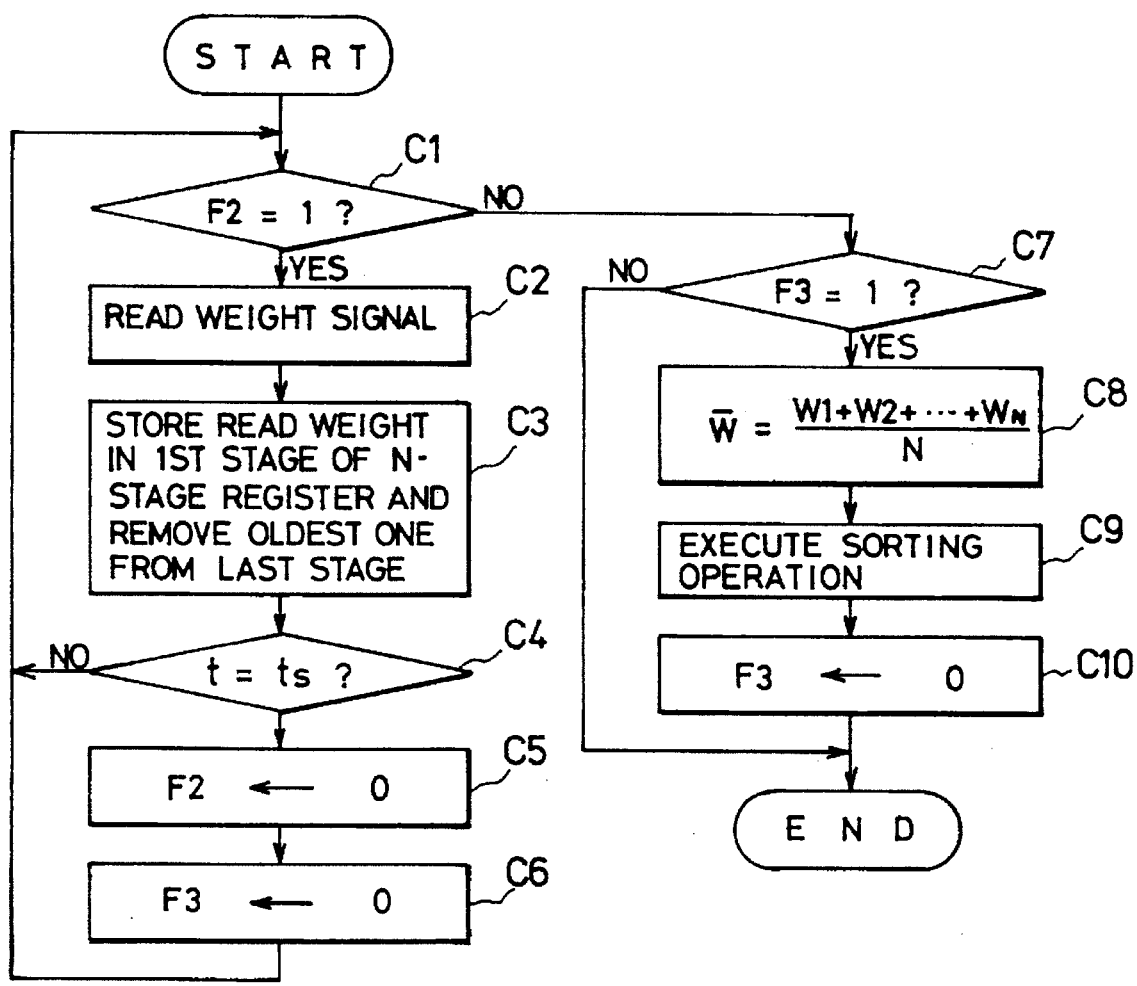
FIG. 6 is a flow chart showing another example of the sorting procedure of the weight sorter embodying this invention.

Although, in the above embodiments, the weight data for testing dispersion are composed of the weight values read at the reading time points, they may be composed of averages of plural (e.g., N) weight values read before the respective reading time points. In this case, however, it is necessary to calculate an average weight corresponding to the reading time point and compare it with a predetermined allowable weight range to effect the sorting operation in the sorting mode also. Now, the description will be made about a program of this sorting mode of operation with reference to the flow chart of FIG. 6.

Figure 4:
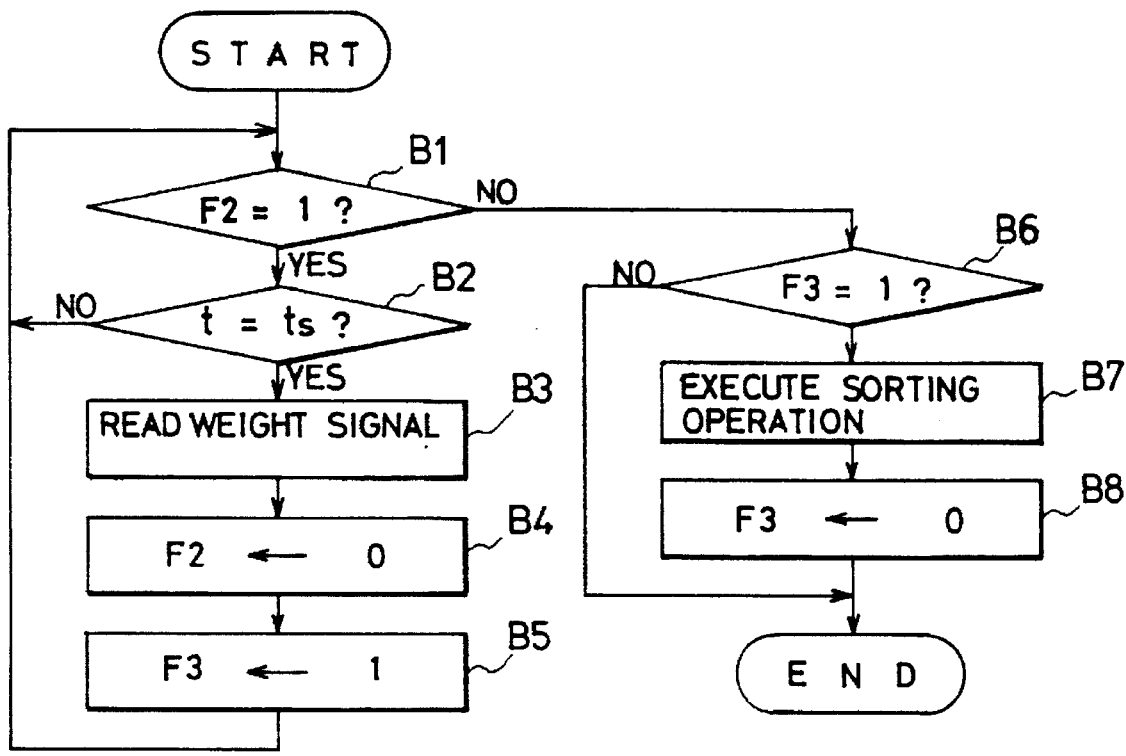
FIG. 4 is a flow chart showing the procedure of sorting articles by weight in the above embodiment of the weighing condition determining device.

In this case, in contrast to the case of FIG. 4, the CPU 11 receives a sense signal of the sensor 5 (step S1) and immediately commenses to read the weight signal (step C2) to sequentially store the read weight values in an N-stage memory register disposed in the memory unit 12 (step C3). At this time, the earliest value is supplied to an end of the register and the oldest value is removed from the other end. The CPU 11 repeats this operation thereafter and, when the time point Ts is reached (step C4), it turns the sense flag F2 to "0" (step C5) and the weighing end flag F3 to "1" (step C6) to return to step C1. Then, the program advances to step C7 since F2 is not "1" and to step C8 since F3 is "1" and an average $\overline{W}$ of N weight values W1, W2, . . . WN currently stored in the memory register is calculated therein. The average value $\overline{W}$ is then compared with a predetermined allowable weight range to supply the result as a sorting signal to the unloading conveyer 3 for effecting a sorting operation (step C9). At last, the weighing end flag F3 is turned to "0" to finish the sorting operation of that article.

Instead of such a simple average of N measurements as above, the above-mentioned weight data may be composed of moving averages of the N measurements of second or third order. Moreover, it is also possible to form a plurality of weight data matrixes with averages of not only N but also much more measurements, calculate a standard deviation of each group of the above-mentioned m weight values in each matrix and select the minimum value thereof. Furthermore, it is also possible to calculate a standard deviation of each group from groups of matrixes composed of combination of the above-mentioned various matrixes. In any case in the sorting mode of operation, however, it is necessary to calculate an average of the kind corresponding to the selected standard deviation in the above-mentioned step C8 of FIG. 6.

Instead of the above-mentioned standard deviation square deviation $\sigma^2$ and range R (difference between maximum and minimum) may be used of the weight values in each group. Moreover, the weighing condition determining device of this invention can be applied not only to such weight sorter as above but also to other dynamic weighing devices such as truck scale.

In one preferred embodiment, the invention comprises a calibration device as part of a dynamic weighing device, such as the weight sorter of FIGS. 1 and 2, for determining a specific reading time point at which weight measurements of articles are taken by the dynamic weighing device. The dynamic weighing device comprises a weight sensor 5 for sensing the weight of successive articles and producing a weight signal corresponding to the weight of a weighed article, and means (including I/O 10, CPU 11 and memory 12) for reading the weight of the successive articles at the specific reading time point determined by the calibration device. The CPU reads the weight signal value of a sample article at least twice at each of a plurality of predetermined time points during which the weight of the sample article is being sensed by the sensor and stores the read values in memory 12. In one preferred embodiment, as illustrated in FIG. 1, the samples may be taken during the time interval $t_w$ between the time periods T1 and Tn. The CPU then calculates a parameter value representing dispersion of the read values at each of the predetermined time points. Next, the CPU executes software to select one of the parameter values representing dispersion based upon a predetermined criterion and determines the time point associated with the selected parameter value. Finally, the software instructs the CPU to set the specific reading time point of the dynamic weighing device as the time point associated with the selected parameter value, whereby the successive articles are subsequently consecutively weighed by the dynamic weighing device at the specific reading time point.

In another preferred embodiment, the invention comprises a calibration device for determining a specific response characteristic value of a filter of a dynamic weighing device for subsequently taking weight measurements of articles. The dynamic weighing device comprises a weight sensor for sensing the weight of successive articles and producing a weight signal corresponding to the weight of a weighed article, the filter for filtering the weight signal and outputting a filtered weight signal, and means for reading the weight of the successive articles at the specific response characteristic value determined by the calibration device at a specific time point. The CPU switches a response characteristic of the filter among a plurality of values and reads the filtered signal from the filter at the specific time point during which the weight of a first article is being sampled at least twice for each response characteristic value. The CPU stores the read values and calculates a parameter value representing dispersion of the read values at each response characteristic value. Next, the CPU selects one of the parameter values representing dispersion based upon a predetermined criterion and determines the response characteristic value associated with the selected parameter value. The CPU then sets the specific response characteristic value of the filter of the dynamic weighing device as the response characteristic value associated with the selected parameter value, whereby the successive articles are subsequently consecutively weighed by the dynamic weighing device at the specific response characteristic value of the filter.

As described above, the weighing condition determining device of this invention needs no time and labor for preliminary adjustment of the dynamic weighing device and requires no skill and experience of the operator of the device since it can automatically determine optimum weight signal reading time point and/or filter characteristic which gives the least dispersion of measurements of similar weights or derivatives thereof such as averages. Moreover, this device needs no expensive graphic display device since any visual display is not effected during execution of the operation programs of this invention.

We claim:

1. A calibration device for determining a specific reading time point at which weight measurements of articles are taken by a dynamic weighing device, the dynamic weighing device comprising a weight sensor for sensing the weight of successive articles and producing a weight signal corresponding to the weight of a weighed article, and means for reading the weight of the successive articles at the specific reading time point determined by the calibration device, the calibration device comprising:

means for reading the weight signal value of a sample article at least twice at each of a plurality of predetermined time points during which the weight of the sample article is being sensed by the sensor;

means for storing the read values;

means for calculating a parameter value representing dispersion of the read values at each of the predetermined time points;

means for selecting one of the parameter values representing dispersion based upon a predetermined criterion;

means for determining the time point associated with the selected parameter value; and means for setting the specific reading time point of the dynamic weighing device as the time point associated with the selected parameter value, whereby the successive articles are subsequently consecutively weighed by the dynamic weighing device at the specific reading time point.

2. The calibration device of claim 1 wherein the selecting means comprises means for selecting the smallest parameter value representing dispersion.

3. The calibration device of claim 1 wherein the calculating means comprises means for calculating a standard deviation or variance parameter value.

4. A calibration device for determining a specific response characteristic value of a filter of a dynamic weighing device for subsequently taking weight measurements of articles, the dynamic weighing device comprising a weight sensor for sensing the weight of successive articles and producing a weight signal corresponding to the weight of a weighed article, the filter for filtering the weight signal and outputting a filtered weight signal, and means for reading the weight of the successive articles at the specific response characteristic value determined by the calibration device at a specific time point, the calibration device comprising:

means for switching a response characteristic of the filter among a plurality of values;

means for reading the filtered signal from the filter at the specific time point during which the weight of a first article is being sensed by the sensor at least twice for each response characteristic value;

means for storing the read values;

means for calculating a parameter value representing dispersion of the read values at each response characteristic value;

means for selecting one of the parameter values representing dispersion based upon a predetermined criterion;

means for determining the response characteristic value associated with the selected parameter value; and means for setting the specific response characteristic value of the filter of the dynamic weighing device as the response characteristic value associated with the selected parameter value, whereby the successive articles are subsequently consecutively weighed by the dynamic weighing device at the specific response characteristic value of the filter.

5. The calibration device of claim 4 wherein the selecting means comprises means for selecting the smallest parameter value representing dispersion.

6. The calibration device of claim 4 wherein the calculating means comprises means for calculating a standard deviation or variance parameter value.

7. The calibration device of claim 4 wherein the switching means comprises means for switching a time constant of the filer among a plurality of values.

8. A calibration device for determining a specific reading time point and a specific filter response characteristic value at which weight measurements of articles are taken by a dynamic weighing device, the dynamic weighing device comprising a weight sensor for sensing the weight of successive articles and producing a weight signal corresponding to the weight of a weighed article, a filter for filtering the weight signal and outputting a filtered weight signal, and means for reading the weight of the successive articles at the specific reading time point and the specific response characteristic value determined by the calibration device, the calibration device comprising:

means for switching a response characteristic of the filter among a plurality of values;

means for reading the treated signal from the filter at least twice at each of a plurality of time points during which the weight of a first article is being sensed by the sensor for each response characteristic value;

means for storing the read values;

means for calculating a parameter value representing dispersion of the read values at each time point at each response characteristic value;

means for selecting one of the parameter values representing dispersion based upon a predetermined criterion;

means for determining the time point and response characteristic value associated with the selected parameter value; and means for setting the specific reading time point and the specific response characteristic value of the dynamic weighing device as the time point and response characteristic value associated with the selected parameter value, whereby the successive articles are subsequently consecutively weighed by the dynamic weighing device at the specific reading time point and specific response characteristic value.

9. The calibration device of claim 8 wherein the selecting means comprises means for selecting the smallest parameter value representing dispersion.

10. The calibration device of claim 8 wherein the calculating means comprises means for calculating a standard deviation or variance parameter value.

11. The calibration device of claim 8 wherein the switching means comprises means for switching a time constant of the filter among a plurality of values.

12. A calibration method for determining a specific reading time point at which weight measurements of articles are taken by a dynamic weighing device, the dynamic weighing device comprising a weight sensor for sensing the weight of successive articles and producing a weight signal corresponding to the weight of a weighed article, and a means for reading the weight of the successive articles at the specific reading time point determined by the calibration method, the calibration method comprising:

reading the weight signal value of a sample article at least twice at each of a plurality of predetermined time points during which the weight of the sample article is being sensed by the sensor;

storing the read values;

calculating a parameter value representing dispersion of the read values at each of the predetermined time points;

selecting one of the parameter values representing dispersion based upon a predetermined criterion;

determining the time point associated with the selected parameter value; and setting the specific reading time point of the dynamic weighing device as the time point associated with the selected parameter value, whereby the successive articles are subsequently consecutively weighed by the dynamic weighing device at the specific reading time point.

13. The calibration method of claim 12 wherein the step of selecting comprises selecting the smallest parameter value representing dispersion.

14. The calibration method of claim 12 wherein the step of calculating comprises calculating a standard deviation or variance parameter value.

15. A calibration method for determining a specific response characteristic value of a filter of a dynamic weighing device for subsequently taking weight measurements of articles, the dynamic weighing device comprising a weight sensor for sensing the weight of successive articles and producing a weight signal corresponding to the weight of a weighed article, the filter for filtering the weight signal and outputting a filtered weight signal, and means for reading the weight of the successive articles at the specific response characteristic value determined by the calibration method at a specific time point during which the weight of a first article is being sensed by the sensor, the calibration method comprising:

switching a response characteristic of the filter among a plurality of values;

reading the filtered signal from the filter at the specific time point at least twice for each response characteristic value;

storing the read values;

calculating a parameter value representing dispersion of the read values at each response characteristic value;

selecting one of the parameter values representing dispersion based upon a predetermined criterion;

determining the response characteristic value associated with the selected parameter value; and setting the specific response characteristic value of the filter of the dynamic weighing device as the response characteristic value associated with the selected parameter value, whereby the successive articles are subsequently consecutively weighed by the dynamic weighing device at the specific response characteristic value of the filter.

16. The calibration method of claim 15 wherein the step of selecting comprises selecting the smallest parameter value representing dispersion.

17. The calibration method of claim 15 wherein the step of calculating comprises calculating a standard deviation or variance parameter value.

18. The calibration method of claim 15 wherein the step of switching comprises switching a time constant of the filter among a plurality of values.

19. A calibration method for determining a specific reading time point and a specific filter response characteristic value at which weight measurements of articles are taken by a dynamic weighing device, the dynamic weighing device comprising a weight sensor for sensing the weight of successive articles and producing a weight signal corresponding to the weight of a weighed article, a filter for filtering the weight signal and outputting a filtered weight signal, and means for reading the weight of the successive articles at the specific reading time point and the specific response characteristic value determined by the calibration method, the calibration method comprising:

switching a response characteristic of the filter among a plurality of values;

reading the treated signal from the filter at least twice at each of a plurality of time points during which the weight of a first article is being sensed by the sensor for each response characteristic value;

storing the read values;

calculating a parameter value representing dispersion of the read values at each time point at each response characteristic value;

selecting one of the parameter values representing dispersion based upon a predetermined criterion;

determining the time point and response characteristic value associated with the selected parameter value; and setting the specific reading time point and the specific response characteristic value of the dynamic weighing device as the time point and response characteristic value associated with the selected parameter value, whereby the successive articles are subsequently consecutively weighed by the dynamic weighing device at the specific reading time point and specific response characteristic value.

20. The calibration method of claim 19 wherein the step of selecting comprises selecting the smallest parameter value representing dispersion.

21. The calibration method of claim 19 wherein the step of calculating comprises calculating a standard deviation or variance parameter value.

22. The calibration method of claim 19 wherein the step of switching comprises switching a time constant of the filter among a plurality of values.

* * * * *